United States Patent [19]

Nakajima et al.

[11] 3,949,110

[45] Apr. 6, 1976

[54] SPECIALLY FORMED SHRINKABLE TUBE, ITS MANUFACTURING METHOD AND THE ARTICLES USING SUCH TUBE

[75] Inventors: Toyoshi Nakajima; Keiichi Kojima; Hiroshi Nishitani; Toshifumi Inui, all of Osaka, Japan

[73] Assignee: Sumitomo Electric Industries, Ltd., Osaka, Japan

[22] Filed: May 7, 1974

[21] Appl. No.: 467,746

[30] Foreign Application Priority Data
May 10, 1973  Japan.................................. 48-52278
May 30, 1973  Japan.................................. 48-60655

[52] U.S. Cl. ........... 428/36; 174/74 A; 174/DIG. 8; 204/159.14; 264/22; 264/151; 264/209; 264/230
[51] Int. Cl.² .................. H02G 15/04; F16L 47/00
[58] Field of Search........ 264/209, 210 R, 230, 151, 264/22, DIG. 71; 174/DIG. 8, 74 A; 428/36; 204/159.14, 159.2

[56] References Cited
UNITED STATES PATENTS

| | | | |
|---|---|---|---|
| 3,106,441 | 10/1963 | Harrison et al. | 264/22 |
| 3,303,243 | 2/1967 | Hughes et al. | 174/74 A |
| 3,370,112 | 2/1968 | Wray | 264/22 |
| 3,448,182 | 6/1969 | Derbyshire et al. | 264/230 |
| 3,490,973 | 1/1970 | Graff et al. | 264/95 |
| 3,567,259 | 3/1971 | Benson et al. | 264/230 |

FOREIGN PATENTS OR APPLICATIONS
1,149,611   4/1969   United Kingdom.............. 174/74 A Primary Examiner—Jeffery R. Thurlow
Attorney, Agent, or Firm—Carothers and Carothers

[57] ABSTRACT

A method of manufacturing heat shrinkable tubing having one portion thereof in the form of a single tube and the remaining portion thereof in the form of plural tubes. The heat shrinkable tubing is manufactured by extruding a thermoplastic tube and then longitudinally sealing the tube periodically with applied pressure while the tube is heated to form predetermined plural tube lengths. The tube is then subjected to irradiation, heated to at least the softening temperature of the material of the tube and it is then partially inflated and thermoset by cooling to impart heat shrinkable properties to the tube. The heat shrinkable tube so formed is then periodically cut to form a plurality of heat shrinkable tube sections which each consist of a single tube portion and a remaining plural tube portion.

6 Claims, 7 Drawing Figures

SPECIALLY FORMED SHRINKABLE TUBE, ITS MANUFACTURING METHOD AND THE ARTICLES USING SUCH TUBE

BACKGROUND OF THE INVENTION

This invention relates to a heat shrinkable tube having a special form, a manufacturing method of the tube and articles using such tube.

In recent years electronic devices have incorporated many extremely complicated and small sized wirings for the construction of circuits.

In these devices, there are special difficulties experienced with respect to the termination of wires and the insulation of lead wires of small lamps for data indication, operation indication and the like.

SUMMARY OF THE INVENTION

An object of the present invention is to provide a heat shrinkable tube having a special form which is preferably used in a branching portion in the wiring of electronic devices.

A further object of the present invention is to provide an improved manufacturing method of such heat shrinkable tubes.

The objects and advantages of the present invention will be readily made apparent from the following detailed description and the accompanying drawings thereof.

BRIEF EXPLANATION OF DRAWINGS

FIG. 2b is a cross section along line A–A of FIG. 2a.

THE DETAILED EXPLANATION OF THE PRESENT INVENTION

Figure 1:
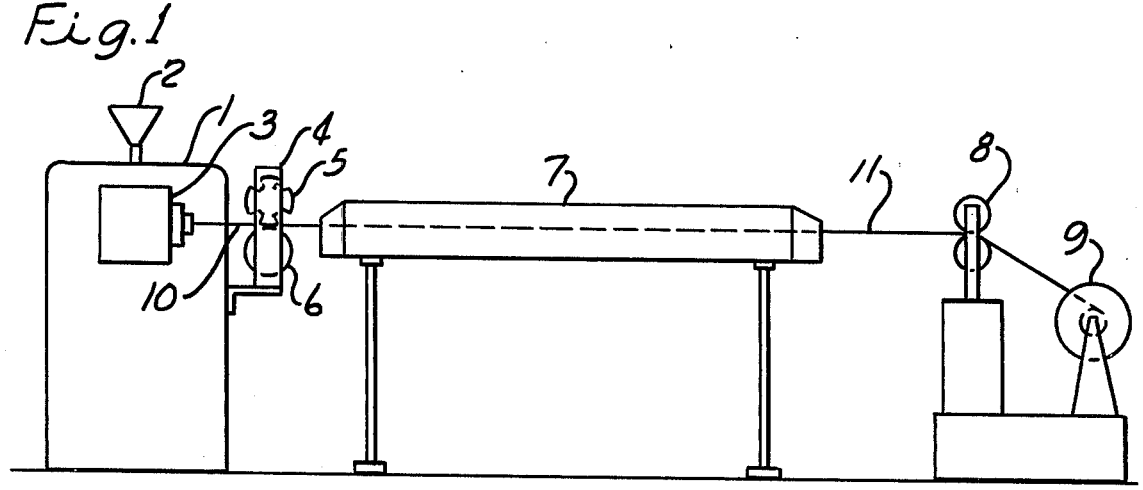
FIG. 1 is a diagrammatic side view of a manufacturing apparatus for making a plastic tube having a special form.

In FIG. 1, 1 denotes an extruder, 2 an inlet for feeding plastic material of the extruder 1, 3 a cross head, 4 a device for process sealing the extruded tube longitudinally for sequentially imparting a special form to the extruded tube. Device 4 has a couple consisting of a roller 5 having a suitable number of blades provided at its periphery and a roller 6 having a flat tread facing the edge of blades of roller 5, the rollers 5 and 6 being rotated with the same peripheral speed. Element 7 is a cooling bath, 8 a pinching roller for drawing up the plastic tube 11, 9 a drum winding the tube 11, 10 an extruded hot plastic tube, and 11 is a plastic tube imparted with the special form.

In FIG. 1, the plastic material, for example polyethylene, is fed to the inlet 2 of the extruder 1 and a plastic tube having a desired cross section and wall thickness is extruded continuously from the cross head 3. The extruded tube 10 is supplied to the sealing device 4 while the tube 10 is still hot, where the tube 10 is squeezed between the sealing rollers 5 and 6. The tube 10 is pressed by the couple of rollers 5 and 6 and periodically sealed longitudinally in a sequential manner by the length of the trace of edge of the blades of roller 5. The space between the edge of the respective blade and the flat surface of the tread of opposing roller 6 must be so separated as to seal the opposing walls of tube 10. Tube 10 is periodically given the same form sequentially. Tube 10 is cooled immediately by the cooling bath 7 after being taken out from the sealing device, is drawn by the pinching rollers 8 and wound by the drum 9.

Figure 2A:
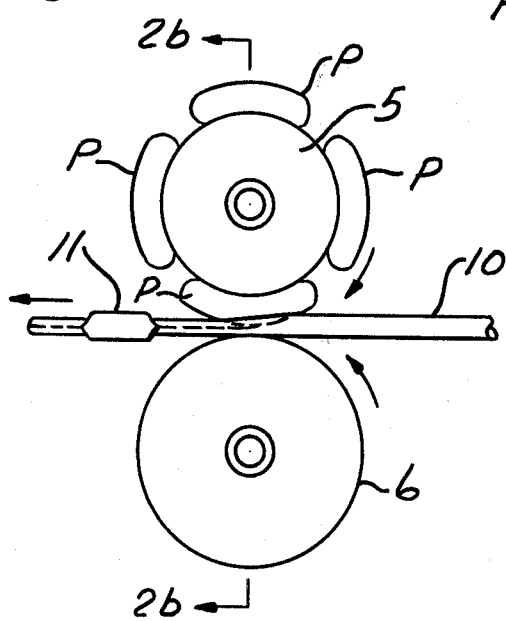
FIG. 2a is a diagrammatic side view of a sealing device in the apparatus shown in FIG. 1.

FIG. 2a is a enlarged diagramatic side view of the sealing device 4. In FIGS. 2a and b tube 10 is a plastic tube which is extruded and still hot. Element 11 is a sealed tube having the special periodic form. Rollers 5 and 6 are driven synchronously. P are blades fixed on the periphery of the roller 5, the number of blades and the perimeter of the edge roller 5 being selected to obtain a suitable length of a sealed portion of tube 10 according to the desired design. The edge of blades 5 should be made suitably sharp so as to be effective for convenient separation along the sealed portion in a later process.

The tube 11 having sequential periodic sealing therefore has two different types of cross-section, one of which has the same cross-section as the original extruded tube, the other of which has two circular cross sections connected by the sealed portion.

The tube 11 is subsequently conveyed to a cross linking process where it is subjected to a high velocity electron beam irradiation.

The dose strength of the irradiation must be controlled to an optimum value for a subsequent inflation process in accordance with the size and the material of the tube.

The irradiated or cross linked plastic tube 11 is then conveyed to heat, inflation and thermosetting processes in order to impart a heat shrinkable property.

Figure 3:
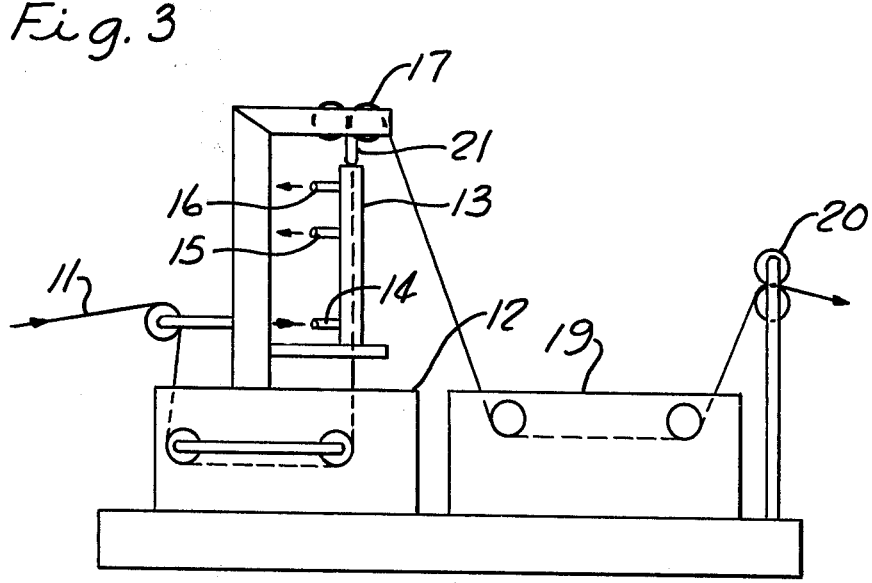
FIG. 3 is a diagrammatic side view of a manufacturing apparatus for inflating and thermosetting the plastic tube having a special form which is produced by the apparatus shown by FIG. 1.

FIG. 3 shows a manufacturing apparatus for performing the heat, inflation and thermosetting processes. In FIG. 3, 11 is an irradiated tube, 12 is a heat bath with a liquid such as ethylene glycol heated to about 150°C, 13 is an assembly for inflation and thermoset of the heated tube 11, 14 is an inlet of cooling water for cooling inflated tube in the assembly 13, 15 is an air outlet for making a pressure difference between the inside and outside of the tube 11 in the assembly 13, 16 is an outlet for the cooling water, 17 is a pair of the pinching roller for drawing up the tube 11, 18 is an inflated and thermoset plastic tube, 19 is a rinsing bath for rinsing the heater liquid remaining on the surface of the tube 11 and 20 is a pair of pinch roller for drawing up the tube 10.

In FIG. 3, the irradiated tube 11 is continuously conveyed to this manufacturing apparatus, immersed in the heat bath 12 and heated to about 150°C, a temperature above the softening temperature. The heated tube 11 is pulled up and fed into the assembly 13 for inflation and thermoset. At the openings of the inlet and outlet of the assembly 13, there is provided an air sealing flexible die of many superimposed thin plastic fins fixed around the opening.

In the inflation process, if some superatmosphere pressure is applied to the inside of tube 11, inflation of tube will be more suitably performed.

Accordingly, the space of the inside of the assembly 13 and the outside of the tube is evacuated so as to inflate the heated tube 11, by which the tube is inflated and the inflated wall of the tube then touches the cooled inner cylindrical wall of assembly 13 which is perforated with many holes for evacuation and is also immediately cooled by the cooling water. The tube is thus quickly cooled when it touchs the cooled wall and thereby thermoset, whereby it obtains a heat shrinkable property.

The cooled and thermoset tube 11 is drawn up by the pinching roller 17 and fed to the rinsing bath 19 where liquid from the heater bath 12 still remaining on the surface of the tube is rinsed out, and the tube is drawn up by pinching roller 20 and wound on a drum.

EXAMPLE I

Figure 2B:
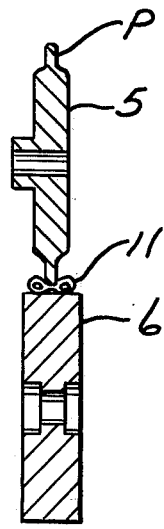

In the case where the material of tube 10 is selected as polyethylene, the extruded tube is sealed subsequently by means of the apparatus shown by FIG. 1, the sealed tube is subjected to irradiation, the irradiated tube is heated, inflated and thermoset by means of the apparatus shown by FIG. 2. The rate resulting in good inflation in the heating, inflation, and thermosetting process is obtained by experiment wherein the tube irradiated by 20 Mrad, 30 Mrad or 40 Mrad is respectively applied for inflation in accordance with three pressure differences 0.5 kg/cm², 0.7 kg/cm² and 1.0 kg/cm².

The rate resulting in good inflation is given by the ratio between the number obtained by subtracting the number of punctured portions from a selected total number of sequentially sealed portions and the selected total number of sealed portions.

The puncturing of the tube occurs at approximately both ends of each sealed portion.

The rate resulting in good inflation is given in the table I.

TABLE I

| $\Delta P$ kg/cm² Irradiation dose | Rate resulting in good inflation | | |
|---|---|---|---|
| | 0.5 kg/cm² | 0.7 kg/cm² | 1.0 kg/cm² |
| 20 Mrad | 100% | 100% | 100% |
| 30 Mrad | 99% | 100% | 100% |
| 40 Mrad | 100% | 100% | 100% |

$\Delta P$: Pressure difference between the inside and the outside of the tube

EXAMPLE II

In the case where the material of the tube is selected as ethylenevinyl acetate copolymer, the extruded tube is manufactured in the same way as explained with respect to example I, the rate resulting in good inflation is obtained by experiment wherein several kinds of tubes of vinyl acetate content of 5%, 10%, 15%, 20%, 25%, 30%, and 35% each are irradiated by 20 Mrad 30 Mrad and 40 Mrad respectively and applied respectively for inflation in accordance with three diffreeent pressure differences 0.5 kg/cm² 0.7 kg/cm² and 10 kg/cm².

The rate resulting in good inflation of this case is given in the table II.

Table II

| Kinds of ethylene vinyl acetate (content of vinyl acetate) | Rate resulting in good inflation | | | |
|---|---|---|---|---|
| | Irradiation dose Mrad | 0.5 | $\Delta P$ kg/cm² 0.7 | 1.0 |
| 5%(weight) | 20 Mrad | 100% | 100% | 95% |

Table II-continued

| Kinds of ethylene vinyl acetate (content of vinyl acetate) | Rate resulting in good inflation | | | |
|---|---|---|---|---|
| | Irradiation dose Mrad | 0.5 | $\Delta P$ kg/cm² 0.7 | 1.0 |
| | 30 " | 100% | 100% | 98% |
| | 40 " | 100% | 100% | 100% |
| 10%(weight) | 20 " | 100% | 100% | 100% |
| | 30 " | 100% | 100% | 99% |
| | 40 " | 100% | 100% | 100% |
| 15%(weight) | 20 " | 100% | 100% | 98% |
| | 30 " | 100% | 97% | 100% |
| | 40 " | 100% | 100% | 100% |
| 20%(weight) | 20 " | 100% | 100% | 100% |
| | 30 " | 100% | 100% | 100% |
| | 40 " | 100% | 100% | 100% |
| 25%(weight) | 20 " | 98% | 98% | 100% |
| | 30 " | 100% | 99% | 100% |
| | 40 " | 100% | 99% | 100% |
| 30%(weight) | 20 " | 100% | 100% | 100% |
| | 30 " | 100% | 100% | 100% |
| | 40 " | 100% | 100% | 100% |
| 35%(weight) | 20 " | 100% | 100% | 98% |
| | 30 " | 100% | 98% | 100% |
| | 40 " | 100% | 100% | 100% |

$\Delta P$: Pressure difference between the inside and the outside of the tube

EXAMPLE III

In the case where the material of the tube is selected as a polyvinylchloride compound, the extruded tube is manufactured in the same way as explained with respect to example I. The rate resulting in good inflation of the tube is obtained by experiment wherein the tubes of three kinds of composition of polyvinylchloride (A, B and C) are respectively applied for inflation by the three different pressure differences 0.5 kg/cm², 0.7 kg/cm² and 1.0 kg/cm². The three kinds of composition of polyvinylchloride are given in the table IV.

The rate resulting in good inflation for this case is given in the table III.

Table III

| $\Delta P$ kg/cm² Composition | Rate resulting in good inflation | | |
|---|---|---|---|
| | 0.5 | 0.7 | 1.0 |
| A | 95% | 100% | 99% |
| B | 100% | 100% | 98% |
| C | 100% | 100% | 100% |

$\Delta P$ is the pressure difference between the inside and the outside of the tube.

Table IV

| Composed agents | Composition of polyvinylchloride Compositions | | |
|---|---|---|---|
| | A | B | C |
| Polyvinylchloride (Degree of Polymerization 1300) | 100 | 100 | 100 |
| Dioctylphthalate | 50 | 60 | 80 |
| Tri-basic leab sulfate | 5 | 5 | 5 |

The heat shrinkable tube produced by the manufacturing method of the present invention is cut into small pieces having a predetermined unit length automatically by means of an automatic cutting machine. The final small piece of heat shrinkable tube has a form wherein one end portion of the tube is a single tube and the opposite end portion is separated into a pair of tubes of the same size.

Such a tube is used very conveniently for circuit wiring in electronic devices, for example, in securing and insulating the lead wires of a small lamp and the end portion of the lamp and for securing the terminal portion of a shielded wire.

Figure 4:
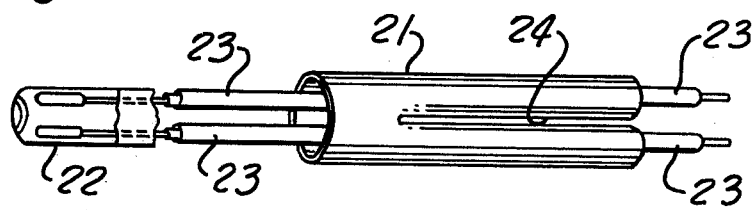
FIG. 4 shows a perceptible view explaining the insulation of the lead wires of a small lamp.

An example wherein a heat shrinkable tube having the special form mentioned above is used for insulating and protecting the end portion of a small lamp and lead wires thereof is shown by FIG. 4.

In FIG. 4, 21 shows a piece of heat shrinkable tube having a unit length, 22 shows a small neon lamp, 23 shows a lead wire of the lamp 22 and 24 shows a sealed portion of the tube 21.

In FIG. 4, the end portion of the lamp 22 and the lead wires 23 of the lamp 22 are covered by heat shrinkable tube 21 and tube 21 is then heated to or above a heat recoverable temperature. The tube thereby shrinks and tightly embraces upon the end portion of the lamp and the lead wires.

In accordance with the teachings of the present invention, the assembly of circuit wiring for small lamps in a complicated electronic device is made very easy, quick and perfect. Another example wherein a heat shrinkable tube of the present invention is used is for insulation of the end portion of a shielded wire as shown by FIG. 5.

Figure 5:
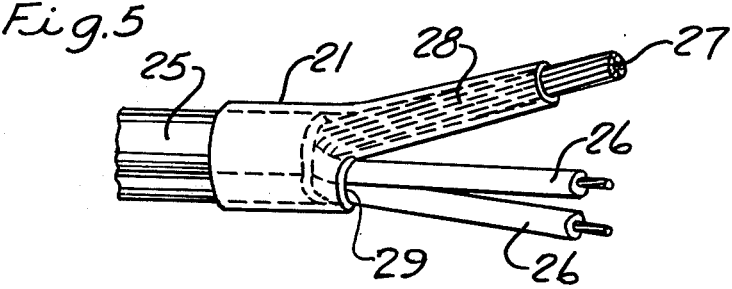
FIG. 5 shows a perceptible view explaining the insulation of the termination of a shield wire.

In FIG. 5, 21 shows a heat shrinkable tube, 25 is a shielded wire, 26 is a insulated wire, 27 represents fine conductors shielding the insulated wire 26, 28 is a separated tube portion of a heat shrinkable tube of the present invention, and 29 is the opening made by cutting off the other separated tube portion of the tube 21.

In FIG. 5, the end portion of the shielded wire 25 is covered by a heat shrinkable tube 21 in such way that the insulated wire 26 is taken out the opening 29 and the shielding conductor is covered by the tube portion 28. The tube is then heated to or above a heat recoverable temperature and shrinks tightly upon the end portion of the shielded wire.

In accordance with the teachings of the heat shrinkable tube of the present invention, the preparation of circuit wiring of shielded wire is made very easy, quick and perfect.

What we claim is:

1. A method of manufacturing heat shrinkable tubing having a special form comprising the steps of extruding a thermoplastic tube having a predetermined diameter, longitudinally sealing said tube periodically with pressure while said tube is heated to form predetermined plural tube lengths, subjecting said tube to irradiation, heating said tube to at least the softening temperature of the material of said tube, partially inflating said heated tube, and thermosetting said inflated tube by cooling to impart heat shrinkable properties thereto.

2. The manufacturing method as claimed in claim 1, wherein a super-atmospheric pressure is applied to the interior of said tube for inflation.

3. The manufacturing method as claimed in claim 1 wherein the selected thermoplastic material of said tube is any thermoplastic material which has heat shrinkable properties.

4. The manufacturing method as claimed in claim 1, including the step of periodically cutting the thermoset tube to form a plurality of heat shrinkable tube sections consisting of a single tube portion and a remaining plural tube portion.

5. The manufacturing method as claimed in claim 1, wherein the steps of inflating and thermosetting are carried out by passing the heated tube through a cylindrical member while evacuating said member and thereby inflating said tube into contact with the member walls to cool and thermoset the heated tube.

6. A heat shrinkable tube having one portion thereof in the form of a single tube and the remaining portion thereof in the form of plural tubes, said tube manufactured by the process of extruding a thermoplastic tube having a predetermined diameter, longitudinally sealing said tube periodically with pressure while said tube is heated to form predetermined plural tube lengths, subjecting said tube to irradiation, heating said tube to at least the softening temperature of the material of said tube, partially inflating said heated tube, thermosetting said inflated tube by cooling to impart heat shrinkable properties thereto, and periodically cutting the thermoset tube to form a plurality of heat shrinkable tubes having one portion thereof in the form of a single tube and the remaining portion thereof in the form of plural tubes.

* * * * *